United States Patent
Huang et al.

(10) Patent No.: US 10,657,088 B2
(45) Date of Patent: May 19, 2020

(54) INTEGRATED CIRCUIT, BUS SYSTEM AND CONTROL METHOD THEREOF

(71) Applicant: Nuvoton Technology Corporation, Hsinchu Science Park (TW)

(72) Inventors: Chih-Hung Huang, Tainan (TW); Chih-Hung Huang, New Taipei (TW); Chun-Wei Chiu, New Taipei (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 0 days.

(21) Appl. No.: 16/547,995

(22) Filed: Aug. 22, 2019

(65) Prior Publication Data
US 2020/0065280 A1    Feb. 27, 2020

(30) Foreign Application Priority Data

Aug. 22, 2018   (TW) .............................. 107129299 A

(51) Int. Cl.
| | | |
|---|---|---|
| *G06F 13/36* | (2006.01) | |
| *G06F 13/362* | (2006.01) | |
| *H04L 12/40* | (2006.01) | |
| *G06F 1/26* | (2006.01) | |

(52) U.S. Cl.
CPC .............. *G06F 13/362* (2013.01); *G06F 1/26* (2013.01); *H04L 12/40013* (2013.01); *H04L 12/40039* (2013.01)

(58) Field of Classification Search
CPC .... G06F 13/362; G06F 1/26; G06F 12/40013; G06F 12/40039
See application file for complete search history.

(56) References Cited

U.S. PATENT DOCUMENTS

2012/0200777 A1*  8/2012  Ooga ....................... H04N 5/21
                                                        348/575

FOREIGN PATENT DOCUMENTS

TW        201230742 A1    7/2012

OTHER PUBLICATIONS

Taiwanese Office Action and Search Report based on Application No. 107129299; dated Nov. 22, 2019.

* cited by examiner

*Primary Examiner* — Henry Tsai
*Assistant Examiner* — John B Roche
(74) *Attorney, Agent, or Firm* — Muncy, Geissler, Olds & Lowe, P.C.

(57) ABSTRACT

An integrated circuit (IC) and a bus system are provided. The IC includes a first function module coupled to a first pin, a switch, a second function module coupled to a second pin, and a controller. The switch selectively couples the first pin to a pull-down resistor according to a control signal. When a specific condition is met, the controller turns on the switch to couple the first pin to a pull-down resistor, and detects a first input signal on the first pin, so as to determine whether there are slave devices coupled to a master device. When the controller determines that the IC is one of the slave devices or the single slave device connected to the master device, the controller turns off the switch to separate the first pin from the pull-down resistor, and assigns the second pin to the second function module.

13 Claims, 4 Drawing Sheets

INTEGRATED CIRCUIT, BUS SYSTEM AND CONTROL METHOD THEREOF

CROSS-REFERENCE TO RELATED APPLICATION

This application claims the benefit of Taiwan Patent Application No. 107129299, filed on Aug. 22, 2018, in the Taiwan Intellectual Property Office, the disclosure of which is incorporated herein in its entirety by reference.

BACKGROUND OF THE INVENTION

1. Field of the Invention

The present invention relates to a bus system, and more particularly to a bus system comprising a plurality of slave devices.

2. Description of the Related Art

In conventional computer system, a chipset, such as a Southbridge chip, is electrically connected to other circuit module through a low pin count (LPC) interface, for example, two SOC (System-on-a-chip) chips having various functions can communicate each other through the LPC interface. The external circuit module connected through the low pin count interface are assigned to different individual addresses, so that the Southbridge chip can communicate the external circuit modules through a one-to-many mechanism. In recent years, a new bus structure is developed, such as the enhanced serial peripheral interface (eSPI) bus, the chipset and the external circuit module can communicate with each other by one-to-one mechanism only through the eSPI bus. Particularly, a master device, such as a Southbridge chip, is provided with only on chip select pin to start or trigger the communication with a slave device such as the external circuit module, and it becomes difficult to perform the communication between the multiple slave devices and the master device having only one chip select pin.

Therefore, what is needed is to develop a bus system to solve the problem.

SUMMARY OF THE INVENTION

In order to solve above-mentioned problem, the present invention provides an integrated circuit comprising a pull-down resistor, a first pin, a first function module coupled to the first pin, a switch coupled between the pull-down resistor and the first pin, a second pin, a second function module coupled to the second pin, and a controller. The switch can selectively couple the first pin to the pull-down resistor, according to a control signal. When a certain condition is met, the controller provides the control signal to turn on the switch, so as to couple the first pin to the pull-down resistor. When the first pin is coupled to the pull-down resistor, the controller can detect a first input signal on the first pin, to determine whether there are a plurality of slave devices electrically connected to a master device. When the first input signal is at a low voltage level, the controller determines that the integrated circuit is the single slave device electrically connected to the master device. When the first input signal is at a high voltage level, the controller determines that the integrated circuit is one of the plurality of slave device electrically connected to the master device. When the controller determines that the integrated circuit is the single slave device or the one of the plurality of slave devices electrically connected to the master device, the controller provides the control signal to turn off the switch to electrically separate the first pin from the pull-down resistor, and assigns the second pin for execution of the function of the second function module.

Furthermore, the present invention provides a bus system comprising a master device, an enhanced serial peripheral interface bus, and at least one slave device. Each of the at least one slave device is electrically connected to the master device through the enhanced serial peripheral interface bus, and comprises a pull-down resistor, a handshake pin, a first function module coupled to the handshake pin, a switch coupled between the pull-down resistor and the handshake pin, an owner strapping pin, a second function module coupled to the owner strapping pin, and a controller. The switch is configured to selectively couple the handshake pin to the pull-down resistor, according to a control signal. When a certain condition is met, the controller provides the control signal to turn on the switch, to couple the handshake pin to the pull-down resistor. When the handshake pin is coupled to the pull-down resistor, the controller detects a first input signal on the handshake pin, to determine whether there are a plurality of slave devices electrically connected to a master device through the enhanced serial peripheral interface bus. After the controller detects the first input signal on the handshake pin, the controller provides the control signal to turn off the switch to electrically separate the handshake pin from the pull-down resistor, and assigns the owner strapping pin for execution of the function of the second function module.

Furthermore, the present invention provides a control method applied to control a slave device of a bus system. The bus system comprises a pull-up resistor, and a master device electrically connected to the slave device through the enhanced serial peripheral interface bus. The control method comprises steps of: when a certain condition is met, electrically coupling the handshake pin of the slave device to the pull-down resistor; and when the handshake pin of the slave device is coupled to the pull-down resistor, detecting the first input signal of the handshake pin to determine whether there are a plurality of slave devices electrically connected to a master device; and, after the first input signal on the handshake pin is detected, electrically separating the handshake pin of the slave device from the pull-down resistor, and assigning an owner strapping pin of the slave device for execution of a first function; and. when first input signal is detected to be at a low voltage level, determining that the slave device is the single slave device electrically connected to the master device, and assigning the handshake pin for execution of a second function; and, when the first input signal is detected to be at a high voltage level, determining that the slave device is one of the plurality of slave devices electrically connected to the master device.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
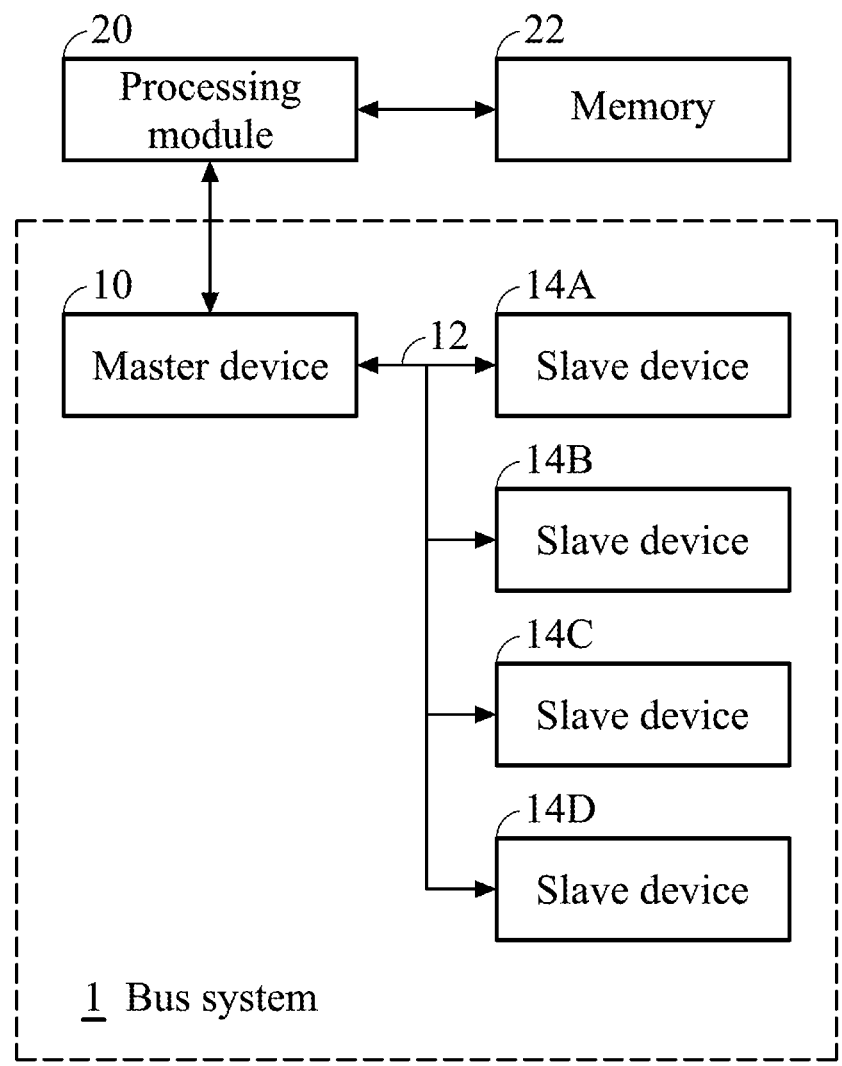
FIG. 1 is a schematic view of a bus system according to some embodiments of the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

FIG. 1 is a schematic view of a bus system 1 according to some embodiments of the present invention. The bus system 1 comprises a master device 10, a bus 12 and a plurality of slave devices 14A to 14D. In some embodiments, the master device 10 can be a Southbridge chip, and the slave devices 14A to 14D can be integrated circuits.

In some embodiments, the master device 10 is electrically connected to a processing module 20 of a computer system (not shown in figures), to respond instructions of the processing module 20 to perform data access with the slave devices 14A to 14D through the bus 12. In some embodiments, the processing module 20 is electrically connected to a memory 22 of the computer system, and configured to access the memory 22 according to requirements of different applications.

In some embodiments, the bus 12 can be the enhanced serial peripheral interface (eSPI) bus. In the bus system 1, the master device 10 is electrically connected to the slave devices 14A to 14D through the bus 12. Furthermore, the master device 10 can communicate with the slave devices 14A to 14D through a one-to-one communication mechanism, and the slave devices 14A to 14D can be in communication with the master device 10 according to an arbitration mechanism, which can be called as a control mechanism. It is worth noticing that a number of the slave devices 14A to 14D shown in figures is merely an example, and the present invention is not limited to thereto.

Figure 2:
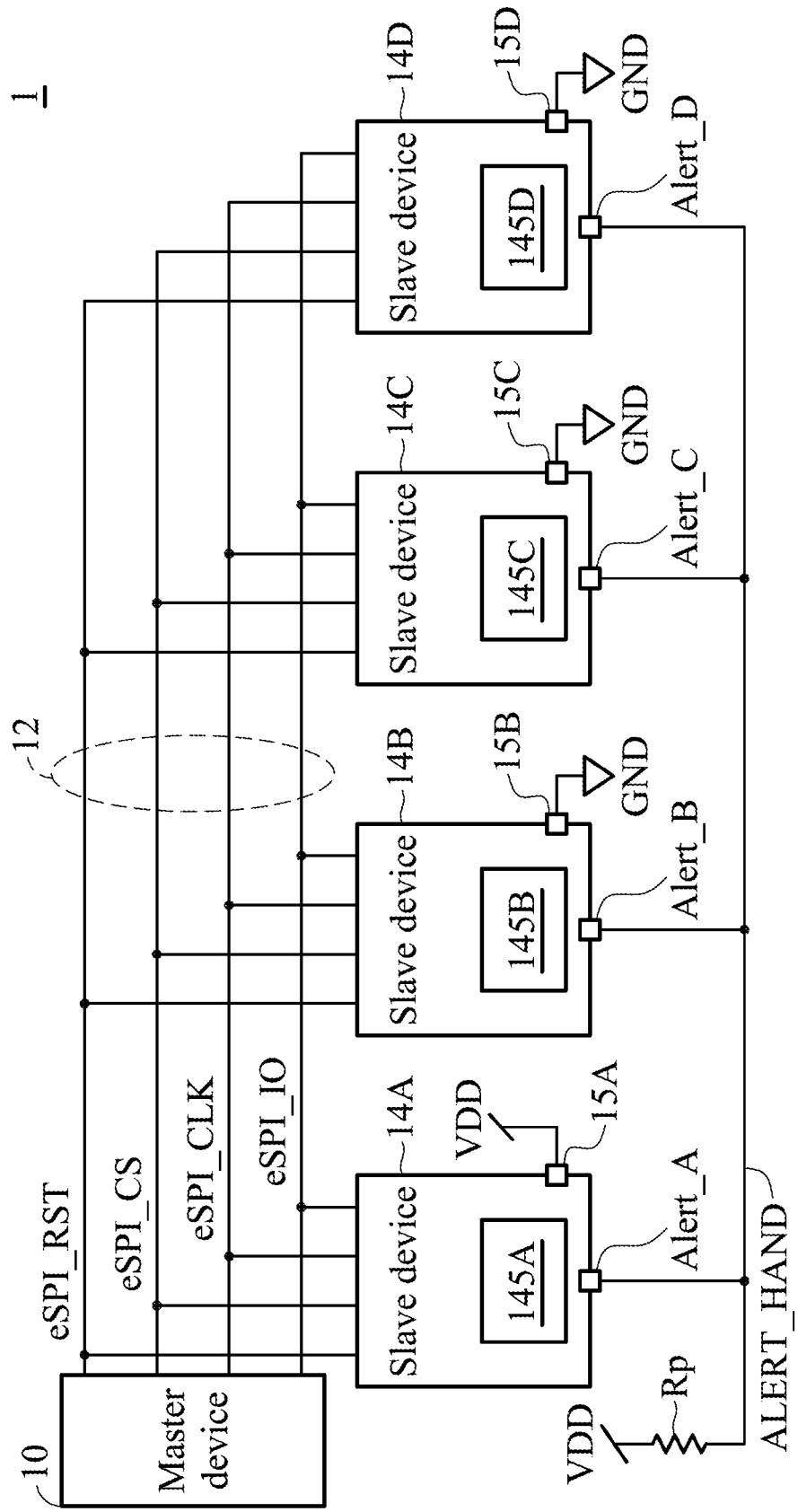
FIG. 2 is a configuration diagram of the bus system of FIG. 1, according to some embodiments of the present invention.

FIG. 2 is a configuration diagram of the bus system 1 of FIG. 1 according to some embodiments of the present invention. In the embodiment, the bus 12 comprises a reset signal line eSPI_RST, a chip select signal line eSPI_CS, a clock signal line eSPI_CLK, and an input/output signal line eSPI_IO. Through the chip select signal line eSPI_CS, the master device 10 can be in communication with the slave devices 14A to 14D by one-to-one communication mechanism. It should be noted that the master device 10 has only one chip select pin connected to the chip select signal line eSPI_CS, and does not have other pin for selecting one of multiple slave device. Furthermore, by using the arbitration mechanism, the slave devices 14A to 14D can be in communication with the master device 10 through the input/output signal line eSPI JO, for example, transmission of data and instruction. When the master device 10 is in communication with one of the slave devices 14A to 14D through the bus 12, the clock signal eSPI_CLK can serve as a reference clock.

In general, according to the original operation mechanism of the chip select signal line eSPI_CS, the master device 10 having the only one chip select pin only can communicate the single slave device. However, by using the arbitration mechanism of the bus system 1, one of the slave devices 14A to 14D can respond to the master device 10 at a single period. As a result, under a condition that the master device 10 is still operated according to the one-to-one communication mechanism, the master device 10 can connect to the slave devices 14A to 14D for communication corresponding to the chip select signal line eSPI_CS through the bus 12 without using other pin of the master device 10 to select one of the slave devices 14A to 14D for communication, thereby increasing the expandability of the bus system 1. Furthermore, the arbitration mechanism of the bus system 1 is independent from the master device 10.

In FIG. 2, the slave devices 14A to 14D comprise owner strapping pins 15A to 15D and the handshake pins Alert_A to Alert_D, respectively. In other words, the slave device 14A comprises the owner strapping pins 15A and the handshake pins Alert_A, and so on. In the embodiment, the owner strapping pin 15A of the slave device 14A is electrically connected to the power source VDD, and the owner strapping pins 15B to 15D of the slave devices 14B to 14D are coupled to ground GND. Among the slave devices 14A to 14D, the slave device 14A is a primary slave device in charge of communication with the master device 10 for execution of related configuration. In the embodiment, the connections of the owner strapping pins 15A to 15D are merely examples, and the present invention is not limited to thereto.

In FIG. 2, the handshake pins Alert_A to Alert_D of the slave devices 14A to 14D are electrically connected to each other and to the handshake control line ALERT_HAND. In the embodiment, the handshake control line ALERT_HAND is electrically connected to the power source VDD through a resistor Rp, so as to make the handshake control line ALERT_HAND at a high voltage value, such as a high logic signal. It should be noted that the handshake control line ALERT_HAND is not connected to the master device 10. In the embodiment, the resistor Rp is a pull-up resistor. Furthermore, the controllers 145A to 145D of the slave devices 14A to 14D can control the handshake pins Alert_A to Alert_D corresponding thereto, to be low voltage level, such as a low logic signal, so as to drive the handshake control line ALERT_HAND, to make the handshake control line ALERT_HAND at the low voltage value. Each of the slave devices 14A to 14D can control the voltage on the handshake control line ALERT_HAND, to request an authority of actively communicating the master device 10. The handshake pins Alert_A to Alert_D is the bi-directional input/output pin, and is open drain in an output mode.

Figure 3:
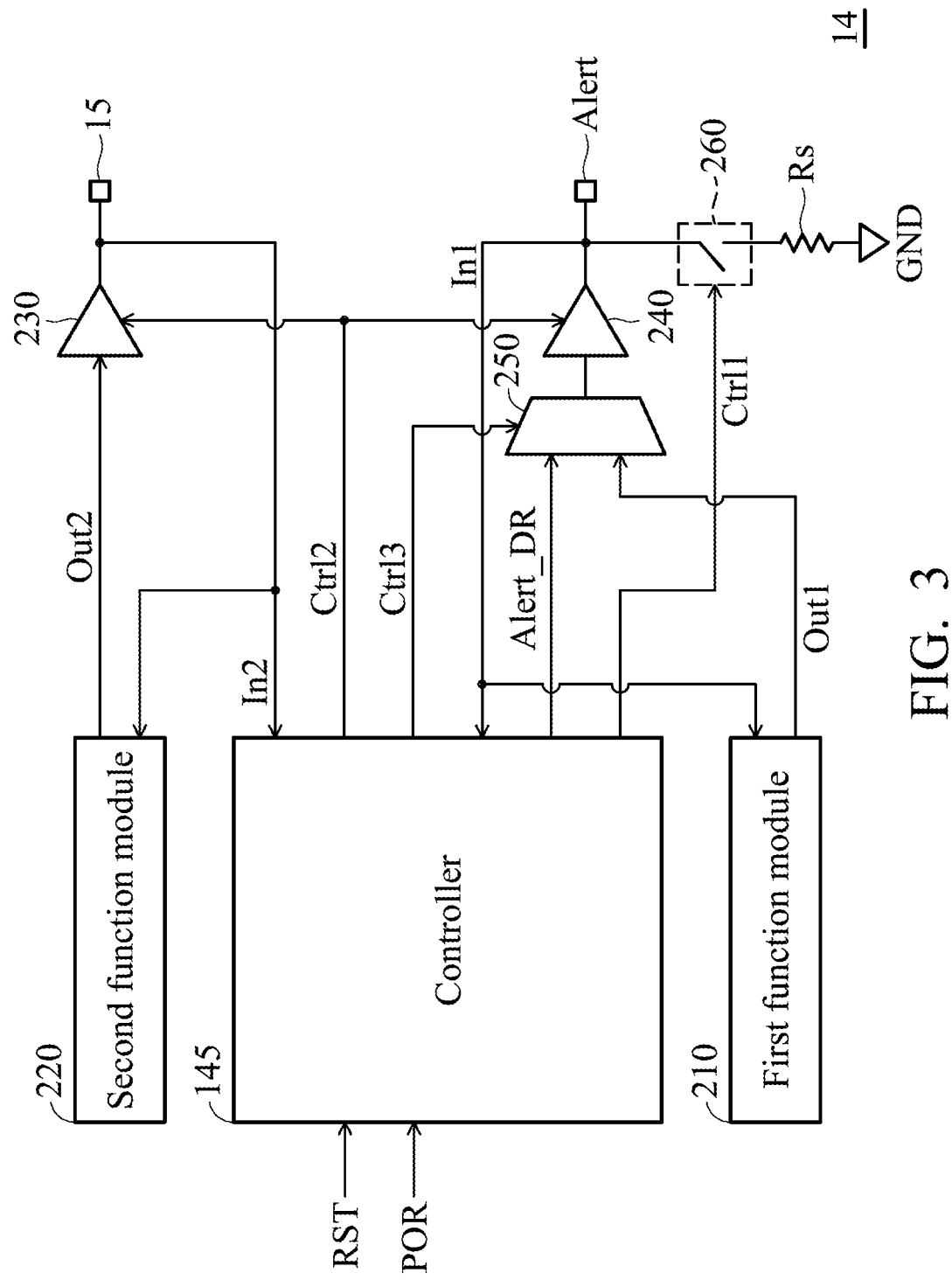
FIG. 3 is a schematic view of a slave device according to some embodiments of the present invention.

FIG. 3 is a schematic view of a slave device 14 according to some embodiments of the present invention. The slave device 14 comprises an owner strapping pin 15, a handshake pin Alert, a controller 145, a first function module 210, a second function module 220, an output buffer 230, an output buffer 240, a selector 250, a switch 260, and a resistor Rs. The resistor Rs is coupled between the switch 260 and the ground GND. In the embodiment, the resistor Rs is a pull-down resistor. It is worth noticing that the resistors Rs of the slave devices 14 (such as the slave devices 14A to 14D of FIG. 2) have the same resistance values. In some embodiments, the resistor Rs is a resistor with high impedance.

In response to the reset signal RST or the power-on signal POR, the controller 145 can provide the control signals Ctrl1 to Ctrl3 to control operations of the output buffers 230 and 240, the selector 250, and the switch 260. For example, the controller 145 can provide the control signal Ctrl2 to enable or disable the output buffers 230 and 240, and the controller 145 can provide the control signal Ctrl1 to turn on or turn off the switch 260. In some embodiments, the reset signal RST is provided by the master device 10 through the reset signal line eSPI_RST of the bus 12. In some embodiments, the power-on signal POR is used to indicate that the slave device 14 is supplied with power by the power source of the bus system 1.

In FIG. 3, the output buffer 230 is coupled to the owner strapping pin 15. In response to the control signal Ctrl2 from the controller 145, the output buffer 230 determines whether to provide the output signal Out2 of the second function module 220 to the owner strapping pin 15. Furthermore, the input signal In2, which is from the owner strapping pin 15, is inputted to the second function module 220 and the controller 145. In response to the control signal Ctrl3 from the controller 145, the selector 250 can selectively provide the driving signal Alert_DR of the controller 145, or the output signal Out1 of the first function module 210 to the output buffer 240. In some embodiments, the selector 250 can be a multiplexer. Furthermore, the output buffer 240 is coupled to a handshake pin Alert. In response to the control signal Ctrl2 from the controller 145, the output buffer 240 can determine whether to provide the signal of the selector 250 to the handshake pin Alert. Furthermore, the input signal In1, which is from the handshake pin Alert, is inputted to the first function module 210 and the controller 145.

Figure 4:
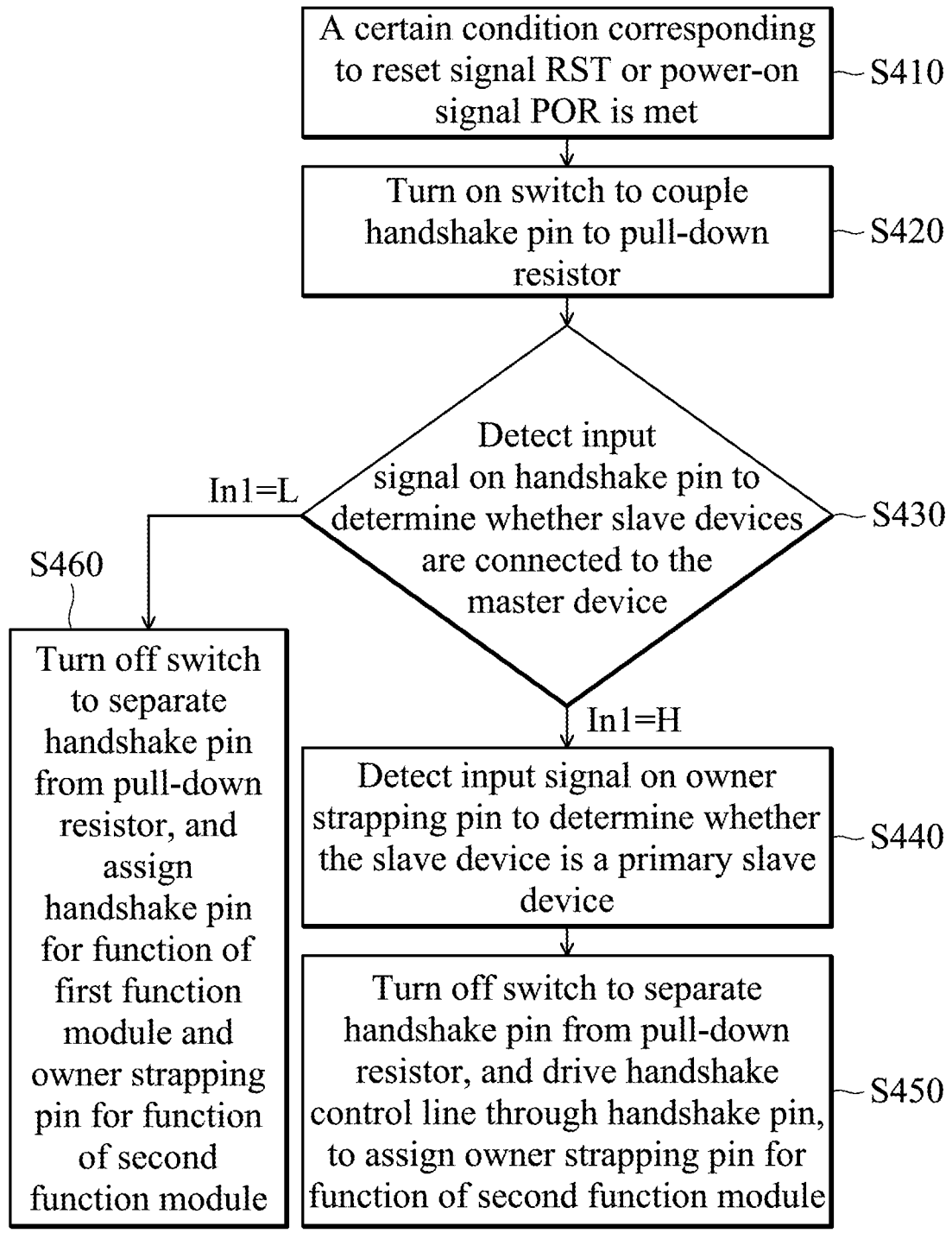
FIG. 4 is a flowchart of a control method according to some embodiments of the present invention, and the control method is used to control the slave device of the bus system.

FIG. 4 is a flowchart of a control method according to some embodiments of the present invention. The control method can be used to control the slave device of the bus system. The control method of FIG. 4 can be executed by the controller of the slave device of the bus system, for example, f the controllers 145A to 145D of FIG. 2, or the controller 145 of FIG. 3.

The bus system 1 includes at least one slave device 14. Furthermore, the handshake pins Alert_A to Alert_D of the slave devices 14A to 14D are electrically connected to each other and to the handshake control line ALERT_HAND. Furthermore, the handshake control line ALERT_HAND is electrically connected to the power source VDD through the pull-up resistor Rp. In the bus system 1, the pull-down resistors Rs of the slave devices have the same resistance values.

Please refer to FIGS. 3 and 4. In a step S410, the controller 145 determines, according to the reset signal RST or the power-on signal POR, whether the certain condition is met or the certain condition exists. In some embodiments, when the reset signal RST indicates that the master device 10 outputs a reset request to the slave device 14, the controller 145 determines that the certain condition is met. In some embodiments, when the power-on signal POR indicates that the slave device 14 is supplied with power, the controller 145 determines that the certain condition is met.

Next, in a step S420, the controller 145 provides the control signal Ctrl1 to turn on the switch 260, so as to couple the handshake pin Alert to the pull-down resistor Rs. As mentioned previously, the pull-down resistor Rs is a resistor with high impedance, so that a weak pull-down circuit can be formed in the handshake pin Alert; at the same time, the controller 145 provides the control signal Ctrl2 to disable the output buffers 230 and 240, so as to prevent the output buffers 230 and 240 from providing signal (such as, the output signal Out2 of the second function module 220 and the output of the selector 250) to the owner strapping pin 15 and the handshake pin Alert. As a result, the controller 145 controls each of the owner strapping pin 15 and the handshake pin Alert to be a tristate status.

Next, in a step S430, the controller 145 can detect the input signal In1 on the handshake pin Alert, to determine whether there are a plurality of slave devices 14 electrically connected to the master device 10 in the bus system 1. In some embodiments, before the detection for the input signal In1 on the handshake pin Alert, the controller 145 can detect the reset signal RST or the power-on signal POR, to determine whether the certain condition is not met or does not exist. For example, when the reset signal RST indicates that the reset request from the master device 10 is ended, the controller 145 determines that the certain condition is not met. In some embodiments, when the power-on signal POR indicates the slave device 14 is normally supplied with power, for example, the initialization setting of the slave device 14 is completed, the controller 145 determines that the certain condition is not met.

As mentioned previously, the handshake pin Alert of the slave device 14 of the bus system 1 are electrically connected to each other through the handshake control line ALERT_HAND. Furthermore, in the bus system 1, the handshake control line ALERT_HAND is electrically connected to the power source VDD through the resistor Rp. When the input signal In1 is detected to be at a high voltage level, for example, the input signal In1 is at a high logic level (In1=H shown in FIG. 4), the controller 145 can determine that there are slave devices 14 coupled to the handshake control line ALERT_HAND. In the bus system 1, the plurality of slave devices 14 are electrically connected to the master device 10 through the bus 12.

Next, in a step S440, the controller 145 detects the input signal In2 on the owner strapping pin 15, to determine whether the slave device 14 is a primary slave device 14 in charge of initial response to the master device 10 in the bus system. In some embodiments, when the bus system is powered on, the primary slave device 14 performs initial communication with the master device 10, to perform necessary configuration. In some embodiments, the owner strapping pin 15 of the primary slave device 14 is coupled to the power source VDD, and the owner strapping pins 15 of the other slave devices 14 are coupled to ground. For example, among the slave devices 14A to 14D shown in FIG. 2, each of the controllers 145A to 145D can determine whether the slave device corresponding thereto is the primary slave device of the bus system according to the corresponding owner strapping pins 15A to 15D. In FIG. 2, the controller 145A of the slave device 14A can determine, according to the input signal In2 having the high voltage level on the owner strapping pin 15A, that the slave device 14A is the primary slave device. Furthermore, the controllers 145B to 145D can determine, according to the input signal In2 having the low voltage level on the owner strapping pins 15B to 15D, that the slave devices 14B to 14D are not the primary slave device.

Next, in a step S450, the controller 145 provides the control signal Ctrl1 to turn off the switch 260, so as to electrically separate the handshake pin Alert from the pull-down resistor Rs; at the same time, the controller 145 provides the control signal Ctrl3 to the selector 250, to provide the driving signal Alert_DR of the controller 145 to the output buffer 240. Furthermore, the controller 145 can also provide the control signal Ctrl2 to the output buffers 230 and 240, so as to control the output buffers 230 and 240 to provide the output signal Out2 of the second function module 220 and the driving signal Alert_DR of the controller 145, to the owner strapping pin 15 and the handshake pin Alert, respectively. By providing the control signal Ctrl2 to enable the output buffer 240, the controller 145 can provide the driving signal Alert_DR to control the voltage on the handshake pin Alert to be a low voltage value, such as a low logic level (In1=L shown in FIG. 4), so as to drive the handshake control line ALERT_HAND. As a result, each of the slave devices 14A to 14D can control the voltage on the handshake control line ALERT_HAND, to request an authority of actively communicating the master device 10. At the same time, by providing the control signal Ctrl2 to enable the output buffer 230, the controller 145 can assign the owner strapping pin 15 as a general-purpose input-output (GPIO) pin for execution of the function of the second function module 220. In some embodiments, the function of the second function module 220 is independent from the master device 10.

In the step S430, when there is only one slave device 14 in the bus system, the handshake pin Alert is not coupled to the handshake control line ALERT_HAND, and the input signal In1 of the handshake pin Alert is determined by the pull-down resistor Rs; and, when the input signal In1 is detected to be at a low voltage level, such as low logic level, the controller 145 can determine that there is only one slave device 14 electrically connected to the master device 10 in the bus system 1 through the bus 12.

Next, in a step S460, the controller 145 provides the control signal Cu11 to turn off the switch 260, so as to electrically separate the handshake pin Alert from the pull-down resistor Rs; at the same time, the controller 145 can provide the control signal Ctrl3 to the selector 250, to provide the output signal Out1 of the first function module 210 to the output buffer 240. Furthermore, the controller 145 can also provide the control signal Ctrl2 to the output buffers 230 and 240, to control the output buffers 230 and 240 to provide the output signal Out2 of the second function module 220 and the output signal Out1 of the first function module 210, to the owner strapping pin 15 and the handshake pin Alert, respectively. As a result, by providing the control signal Ctrl2 to enable the output buffer 240, the controller 145 can assign the handshake pin Alert as a general-purpose input-output pin for execution of the function of the first function module 210. Furthermore, by providing the control signal Ctrl2 to enable the output buffer 230, the controller 145 can assign the owner strapping pin 15 as a general-purpose input-output pin for execution of the function of the second function module 220. In some embodiments, the function of the first function module 210, the function of the second function module 220, or the functions of the first function module 210 and the second function module 220, can be independent from the master device 10.

By measuring the input signal 1111 on the handshake pin Alert, each slave device 14 of the bus system 1 can confirm whether one single slave device 14 or multiple slave devices 14 exists in the bus system 1, without increasing extra pin, and the bus system can be compatible to original structure. Furthermore, by using the switch 260 to electrically separate the handshake pin Alert from the pull-down resistor Rs, the controller 145 can assign the handshake pin Alert for execution of other function through the selector 250 and the output buffer 240. Similarly, the controller 145 can assign the owner strapping pin 15 for execution of other function through the output buffer 230 and function of the slave device 14 can be increased, without increasing the number of pins of the slave device 14. Particularly, the above-mentioned operation of determining the amount of the slave devices connected to the master device is independent from the master device 10.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An integrated circuit, served as a slave device electrically connected to a master device, comprising:
   a pull-down resistor,
   a first pin;
   a first function module coupled to the first pin;
   a switch coupled between the pull-down resistor and the first pin, and configured to selectively couple the first pin to the pull-down resistor according to a control signal;
   a second pin;
   a second function module coupled to the second pin; and
   a controller configured to provide the control signal to turn on the switch when a certain condition is met, so as to couple the first pin to the pull-down resistor, and wherein the controller detects a first input signal of the first pin after the first pin is coupled to the pull-down resistor, so as to determine whether a plurality of slave devices are electrically connected to the master device;
   wherein when the controller detects that the first input signal is at a low voltage level, the controller determines that the integrated circuit is the single slave device electrically connected to the master device;
   wherein when the controller detects that the first input signal is at a high voltage level, the controller determines that the integrated circuit is one of the plurality of slave devices electrically connected to the master device; and
   wherein when the controller determines that the integrated circuit is the single slave device electrically connected to the master device or the one of the plurality of slave devices electrically connected to the master device, the controller provides the control signal to turn off the switch, to electrically separate the first pin from the pull-down resistor, and assign the second pin to execute a function of the second function module.

2. The integrated circuit as claimed in claim 1, wherein after the integrated circuit is powered on, or the master device outputs a reset signal to the integrated circuit, the certain condition is met.

3. The integrated circuit as claimed in claim 1, wherein when the controller detects that the first input signal is at the high voltage level, the controller detects a second input signal on the second pin, to determine whether the integrated circuit is a primary slave device, for performing initial communication with the master device, of the plurality of slave device.

4. The integrated circuit as claimed in claim 1, wherein when the controller determines that the integrated circuit is the single slave device electrically connected to the master device, the controller assigns the first pin to execute a function of the first function module.

5. The integrated circuit as claimed in claim 1, wherein when the controller determines that the integrated circuit is the one of the plurality of slave device electrically connected to the master device, the first pin is electrically connected to the first pins of the other of the plurality of slave device through the handshake control line, and the controller drives the handshake control line through the first pin, wherein the handshake control line is coupled to a power source through a pull-up resistor.

6. A bus system, comprising:
a master device;
an enhanced serial peripheral interface bus; and
at least one slave device electrically connected to the master device through the enhanced serial peripheral interface bus, and each of the at least one slave device comprising:
a pull-down resistor;
a handshake pin;
a first function module coupled to the handshake pin;
a switch coupled between the pull-down resistor and the handshake pin, and configured to selectively couple the handshake pin to the pull-down resistor, according to a control signal;
an owner strapping pin;
a second function module coupled to the owner strapping pin; and
a controller configured to provide the control signal to turn on the switch when a certain condition is met, to couple the handshake pin to the pull-down resistor, and wherein the controlled detects a first input signal on the handshake pin when the handshake pin is coupled to the pull-down resistor, to determine whether a plurality of slave devices are electrically connected to the master device through the enhanced serial peripheral interface bus;
wherein after the controller detects the first input signal on the handshake pin, the controller provides the control signal to turn off the switch, to electrically separate the handshake pin from the pull-down resistor, and assigns the owner strapping pin to execute a function of the second function module.

7. The bus system as claimed in claim 6, wherein when the first input signal is at the low voltage level, the controller determines that the slave device is the single slave device electrically connected to the master device, and when the first input signal is at a high voltage level, the controller determines that the slave device is one of the plurality of slave devices electrically connected to the master device.

8. The bus system as claimed in claim 7, wherein when the controller determines that the slave device is the single slave device electrically connected to the master device, the controller assigns the handshake pin to execute a function of the first function module.

9. The bus system as claimed in claim 7, wherein when the controller determines that the slave device is the one of the plurality of slave device electrically connected to the master device, the handshake pin is electrically connected to the first pins of the other of the plurality of slave devices through the handshake control line, and the controller drives the handshake control line through the handshake pin, and wherein the handshake control line is coupled to a power source through the pull-up resistor.

10. The bus system as claimed in claim 6, wherein after the slave device is powered on or the master device outputs a reset signal to the plurality of slave devices, the certain condition is met.

11. A control method, applied to control a slave device of a bus system, wherein the bus system further comprises a master device electrically connected to the slave device through an enhanced serial peripheral interface bus, and the control method comprising:
electrically coupling the handshake pin of the slave device to a pull-down resistor when a certain condition is met;
when the handshake pin of the slave device is coupled to the pull-down resistor, detecting a first input signal on the handshake pin to determine whether a plurality of slave devices are electrically connected to the master device; and
after the first input signal on the handshake pin is detected, electrically separating the handshake pin of the slave device from the pull-down resistor, and assigning an owner strapping pin of the slave device for execution of a first function;
wherein the step of detecting the first input signal on the handshake pin to determine whether the plurality of slave devices are electrically connected to the master device, comprises:
when detecting the first input signal is at a low voltage level, determining that the slave device is single slave device electrically connected to the master device, and assigning the handshake pin for execution of a second function; and
when the first input signal is detected to be at a high voltage level, determining that the slave device is one of the plurality of slave devices electrically connected to the master device.

12. The control method as claimed in claim 11, wherein the step of determining that the slave device is the one of the plurality of slave devices electrically connected to the master device, further comprises:
driving a handshake control line through the handshake pin;
wherein the handshake pin of the slave device is electrically connected to the handshake pins of the other of the plurality of slave device through the handshake control line, and the handshake control line is coupled to a power source through a pull-up resistor.

13. The control method as claimed in claim 11, wherein the step of determining that the slave device is the one of the plurality of slave devices electrically connected to the master device, further comprises:
detecting a second input signal on the owner strapping pin, to determine whether the slave device is a primary slave device of the plurality of slave devices for performing initial communication with the master device;

wherein when the second input signal is at a first voltage level, the slave device is the primary slave device, and when the second input signal is at a second voltage level, the slave device is not the primary slave device.

* * * * *